United States Patent [19]

Takeuchi et al.

[11] Patent Number: 5,132,255
[45] Date of Patent: Jul. 21, 1992

[54] PLASTIC COMPOSITIONS OF INORGANIC POWDERS AND SINTERED BODIES OF THE SAME

[75] Inventors: Tatsuro Takeuchi, Shiga; Tetsuya Sahara; Motoya Mouri, both of Osaka, all of Japan

[73] Assignee: Takeda Chemical Industries, Ltd., Osaka, Japan

[21] Appl. No.: 527,698

[22] Filed: May 24, 1990

Related U.S. Application Data

[63] Continuation of Ser. No. 298,944, Jan. 19, 1989, abandoned.

[30] Foreign Application Priority Data

Jan. 20, 1988 [JP] Japan .................................. 63-11057
Sep. 16, 1988 [JP] Japan ................................ 63-233280

[51] Int. Cl.$^5$ ...................... C04B 35/02; C04B 35/10; C04B 35/52; C04B 35/58
[52] U.S. Cl. ............................................ 501/94; 501/1; 501/87; 501/88; 501/91; 501/92; 501/93; 501/96; 501/97; 501/103; 501/105; 501/108; 501/109; 501/123; 501/126; 501/127; 501/132; 501/133; 501/134; 501/141; 501/152
[58] Field of Search ................... 501/1, 87, 88, 91, 92, 501/93, 94, 96, 97, 103, 105, 108, 109, 123, 126, 127, 132, 133, 134, 141, 152

[56] References Cited

U.S. PATENT DOCUMENTS

| | | | |
|---|---|---|---|
| 4,089,691 | 5/1978 | Cummisford et al. | 501/133 |
| 4,113,501 | 9/1978 | Edamoto | 501/133 |
| 4,320,074 | 3/1982 | Birchall et al. | 501/127 |
| 4,414,337 | 11/1983 | Ichikawa et al. | 501/103 |
| 4,755,494 | 7/1988 | Ruben | 501/148 |

FOREIGN PATENT DOCUMENTS

| | | |
|---|---|---|
| 0094731 | 11/1983 | European Pat. Off. . |
| 0296932 | 12/1988 | European Pat. Off. . |
| 0297942 | 1/1989 | European Pat. Off. . |
| 1901318 | 7/1969 | Fed. Rep. of Germany . |
| 2820721 | 3/1979 | Fed. Rep. of Germany . |
| 62-105948 | 5/1962 | Japan . |
| 52-32908 | 3/1977 | Japan . |
| 53-6309 | 1/1978 | Japan . |
| 56-114863 | 9/1981 | Japan . |
| 57-82170 | 5/1982 | Japan . |
| 58-181763 | 10/1983 | Japan . |
| 59-30761 | 2/1984 | Japan . |
| 59-116171 | 7/1984 | Japan . |
| 61-31341 | 2/1986 | Japan . |
| 61-117150 | 6/1986 | Japan . |
| 62-30654 | 2/1987 | Japan . |
| 1199882 | 7/1970 | United Kingdom . |

OTHER PUBLICATIONS

Chemical Abstracts, vol. 92, 1980, p. 300, Abstract No. 63423k (corresponding to Japanese Patent No. 54-108828 above).

*Primary Examiner*—William R. Dixon, Jr.
*Assistant Examiner*—Anthony J. Green
*Attorney, Agent, or Firm*—Wegner, Cantor, Mueller & Player

[57] ABSTRACT

An aqueous plastic composition of an inorganic powder which per se has substantially no plasticity which comprises: the inorganic powder and a polysaccharide of natural origin.

The molding and sintering of the plastic composition provide a sintered body of high mechanical strength and dimensional accuracy.

13 Claims, No Drawings

PLASTIC COMPOSITIONS OF INORGANIC POWDERS AND SINTERED BODIES OF THE SAME

This application is a continuation of U.S. application Ser. No. 07/298,944, filed Jan. 19, 1989, now abandoned.

This invention relates to a plastic composition of an inorganic powder and sintered bodies of the same, and further to a method of producing a sintered body of an inorganic powder which per se has substantially no plasticity.

As a conventional method of molding inorganic plastic matters, there has been known a method wherein a plastic clay-water mixture is molded with a potter's wheel, and recently many other methods which use molding dies have been put to practical use. Clay-water mixture is known to be plastic by nature, and can be readily molded by plastic molding.

However, technical ceramic powders such as alumina or zirconia, of which use has lately very increasingly spread in various fields, have substantially no plasticity so that the powders cannot be molded as they are.

In general, it is necessary that an inorganic powder has plasticity in a narrow sense that it is deformed when force is applied thereonto, but also it is necessary that an inorganic powder has plasticity in a broader sense so that the powder is plastic-molded. Namely, it is necessary that the inorganic powder is smoothly extruded through a die head, the extruded body retains its figure or form until it is dried, and the dried body has enough handling strength. The clay-water mixture naturally has these plasticities, but technical ceramic powders have substantially no such plasticities, and accordingly they cannot be plastic-molded as they are.

It is already known that a technical ceramic powder can be made plastic by admixing and kneading with organic materials effective as deflocculants, binders, lubricants, plasticizers and the like in the presence of water, as is described in Ceramics, Vol. 22, No. 5, pp. 385-392 (1987). For example, high molecular weight electrolytes such as homopolymers or copolymers of acrylic acid, or salts thereof are used as deflocculants, water soluble polymers such as polyvinyl alcohol as binders, and emulsions of such substances as wax or stearic acid as lubricants. There are used as plasticizers, for example, glycerin, polyethylene glycol or the like to prepare water base plastic compositions of a technical ceramic powder, whereas phthalic acid esters or the like for oil base plastic compositions. However, in these prior methods, it is necessary to use large amounts of organic materials to prepare plastic compositions of a technical ceramic powder, and for example, organic materials are used in amounts of about 5-20% by weight based on the powders to prepare plastic compositions suitable for extrusion molding.

Sintered bodies of technical ceramic powders have recently found important applications in manufacturing of electronic or machinery parts, in which a high level of dimensional accuracy is required, and therefore the parts are usually produced by injection molding. In injection molding of technical ceramic powders, larger amounts of organic materials are used than in extrusion molding. More specifically, the powders are mixed with organic materials in amounts of about 10-30% by weight based on the powders. The organic materials used include, for example, thermoplastic resin binders such as polystyrene, polyethylene, polypropylene, cellulose acetate, acrylic resin or ethylene-vinyl acetate copolymer, plasticizers such as phthalic acid esters, and lubricants such as stearic acid. The mixture is heated and kneaded, and the resultant oil base plastic composition is injection-molded in the same manner as in thermoplastic resins.

It is possible to provide technical ceramic powders with plasticity by such prior methods as described above, however, since the powders are mixed with large amounts of various organic materials, the molded articles or molds must be dewaxed before sintering. What is more, the dewaxing must be carried out by heating molds very slowly until the mold reaches about 500° C. where the organic materials decompose so that the mold is completely dewaxed, hence the productivity is very low. Furthermore, the mold remarkably contracts during sintering, so that the production of sintered bodies with a high dimensional accuracy is very difficult when technical ceramic powders are made plastic by the prior methods.

A further disadvantage in the prior methods is that it is necessary that the organic materials used are selected suitably among a number of materials depending upon the individual powders used, and it is difficult to design optimum plastic compositions.

The present inventors have made intensive investigations to solve such difficulties as above described involved in the prior arts in plasticicization of inorganic powders, in particular, technical ceramic powders, and found that the addition of small amounts of a certain group of polysaccharides to the powder together with water makes the powder plastic, and that the sintering of the aqueous plastic composition readily provides sintered bodies having a high mechanical strength and dimensional accuracy.

It is, therefore, an object of the invention to provide an aqueous plastic composition of an inorganic powder which per se has substantially no plasticity.

It is also an object of the invention to provide a method of producing sintered bodies of an inorganic powder which per se has substantially no plasticity.

It is a further object of the invention to provide a sintered body of an inorganic powder which per se has substantially no plasticity.

In accordance with the invention, there is provided an aqueous plastic composition of an inorganic powder which comprises an inorganic powder which per se has substantially no plasticity and a polysaccharide.

According to the invention, there is further provided a method of producing a sintered body of an inorganic powder which per se has substantially no plasticity which comprises: admixing and kneading the inorganic powder with a polysaccharide in the presence of water in amounts sufficient to provide a plastic composition, molding the plastic composition, and drying and sintering the plastic composition.

The inorganic powder which per se has substantially no plasticity in the specification is an inorganic powder which has no plasiticity in a broader sense as well as in a narrow sense as is described hereinbefore, and includes, for example, inorganic oxides such as alumina, zirconia, titania, silica, magnesia, ferrite, barium titanate and synthesized cordierite; inorganic carbides such as silicon carbide, boron carbide or tungsten carbide; inorganic nitrides such as silicon nitride, aluminum nitride or boron nitride; inorganic borides such as zirconium boride or titanium boride; and kaolinite, natural kaolin, talc, sepiolite, synthesized clay or hydroxyapatite. These inorganic powders may be used singly or as a mixture of two or more, however, it is desired that the particles are as small as possible, and preferably have a particle size of not more than about one micron.

The polysaccharides used in the invention are of natural origin, and include those of microbial, plant and animal origin.

The term, polysaccharides of natural origin, in the specification should be understood in the most normal sense, and thus semi-synthesized polysaccharides which are obtained by chemical treatment, such as esterification, of polysaccharides of natural origin, are not polysaccharides of natural origin in the specification. In this sense, carboxymethyl cellulose is not included in the polysaccharides of natural origin in the specification. However, chemical means or treatments inevitably utilized to obtain polysaccharides of natural origin are not included in the chemical treatment as defined above, and therefore, for example, neither treatments of culture broth with an alkali and neutralization to obtain polysaccharides of microbial origin, nor extraction treatments to obtain various polysaccharides of plant origin are included in the treatments to obtain semi-synthesized polysaccharides. Therefore, for example, treatments of culture broth with an alkali or neutralization to obtain curdlan are not included in the treatments to obtain semi-synthesized polysaccharides.

On the other hand, for example, esterification or ammonium salt formation of polysaccharides of natural origin are chemical treatments to obtain semi-synthesized polysaccharides when the polysaccharide of natural origin as it is has no ester or ammonium salt structures. However, natural pectic acid as it is has methyl ester structures therein, and thus natural pectic acid is a polysaccharide of natural origin in the specification.

Therefore, there may be mentioned as polysaccharides of microbial origin used in the invention, for example, dextran, gellan gum, xanthan gum, curdlan and pullulan.

There may be mentioned as polysaccharides of plant origin, for example, extraction polysaccharides such as pectin or arabinogalactan; seed polysaccharides such as guar, locust bean gum, tata gum or tamarind seed gum; exudate polysaccharides such as gum tragacanth, gum arabic or gum ghatti; red seaweed (rhodophyceae) polysaccharides such as carageenan; brown seaweed (phaeophyceae) polysaccharides such as alginic acid; structural polysaccharides such as xylan; reserve polysaccharides such as konjak mannan. Further, polysaccharides of animal origin used in the invention may be exemplified by, for example, structural polysaccharides such as chitosan, and mucopolysaccharides such as hyaluronic acid or chondroitin sulfate.

The above mentioned polysaccharides of natural origin are known to be water-retentive. It is likely that the water-retentive properties of the polysaccharides used are one of requisites for providing an inorganic powder which itself is substantially non-plasitic with plasticity.

Among the various polysaccharides as set out above, preferred polysaccharides used in the invention are microbial polysaccharides such as dextran, curdlan, pullulan or the like, and among polysaccharides of plant origin, preferred polysaccharides are seed polysaccharides such as guar or locust bean gum, structural polysaccharides such as xylan, and reserve polysaccharides such as konjak mannan. The use of small amounts of these polysaccharides makes nonplastic inorganic powder plastic.

Most preferred polysaccharides used in the invention are glucans of microbial origin, such as curdlan, pullulan or the like, and curdlan is preferred among these, since curdlan provides nonplastic inorganic powder with a higher plasticity, and sintered bodies produced therefrom have in particular a higher mechanical strength.

Curdlan is a polysaccharide which contains mainly $\beta$-1,3-glucose linkages, and forms a gel when heated. Curdlan may be produced by Alkaligenes or Agrobacterium microorganisms, more specifically, by *Alkaligenes faecalis var myxogenes* 10C3K (Agricultural Biological Chemistry, Vol. 30, p. 196 (1966)), a mutant NTK-u (IFO 13140) of the above (Japanese Patent Publication no 48-32673), *Agrobacterium radiobacter* (IFO 13127) or its mutant (IFO 12126) (Japanese Patent Publication no 48-32674).

Curdlan is a microbial polysaccharide as above, and it may be used in impure state or highly purified, as also the other polysaccharides.

The aqueous plastic compositions of inorganic powder of the invention which per se are substantially nonplastic, contain at least one polysaccharide of natural origin as set out above usually in amounts of about 0.1-10% by weight, preferably in amounts of about 0.5-5% by weight, based on the powder used.

It is desired that a molding aid is used together with polysaccharides in the invention so that the resultant plastic composition has a higher plasticity and produces sintered bodies of a higher mechanical strength. Preferred molding aid include, for example, cellulosic compounds, polyhydric compounds and polyvinyl compounds.

More specifically, the cellulosic compound includes methyl cellulose, ethyl cellulose, carboxymethyl cellulose, sodium carboxymethyl cellulose, hydroxyethyl cellulose and hydroxypropyl cellulose. The polyhydric compound used includes, for example, glycerine; alkylene glycols such as ethylene glycol, propylene glycol or 1,3-butylene glycol; and polyalkylene glycols such as polyethylene glycol or polypropylene glycol. A variety of polyvinyl compounds may be useful as aid, and there may be used, for instance, polyvinyl alcohol, polyvinyl pyrrolidone, polyacrylic acid resins, polyacrylic acid salt resins, e.g., polyammnoum acrylate, acrylic acid-maleic acid copolymers, or their ammonium salts. The polyacrylic acid resin may be cross-linked. A variety of compounds are usable as molding aid in addition to the above, and for example, carboxymethyl starch is one aid which may be used in the invention. The aid may be used singly or as a mixture of two or more, and may be contained in amounts usually of about 0.1-10 parts by weight, preferably in amounts of about 0.5-5 parts by weight, in relation to 100 parts by weight of inorganic powders used.

The aqueous plastic composition of inorganic powders of the invention may be prepared in the same manner as in the preparation of conventional plastic compositions of of inorganic powders. By way of example, one or more of the polysaccharides as before mentioned and, if desired, with a molding aid, both as powders, or as a solution or dispersion in water or a water soluble organic solvent such as methanol or ethanol, are added to the powder, and then fully mixed together. Then, an appropriate amount of water is added to the mixture and kneaded, to provide an aqueous plastic composition of the invention. The method of the preparation of the plastic composition of the invention is not limited to the above exemplified, but a polysaccharide and an aid may be added separately to an inorganic powder.

The plastic composition of the invention may further contain a wetting agent or surfactant such as polyethylene glycol alkylether, or a lubricant such as zinc stearate, aluminum stearare or magnesium stearate.

A sintered body of the invention is obtained by molding the plastic composition as above set forth to a green mold, by, for example, extrusion molding, drying the mold, and then sintering the mold at high temperatures. The sintering temperatures are selected depending upon the individual inorganic powders used.

The plastic composition of the invention contains much smaller amounts of organic materials than in the conventional plastic compositions of inorganic powders, and therefore, it can be sintered at larger raising rates of temperature with much smaller contraction, and accordingly at a higher productivity. Moreover, the sintered body thus produced has a higher mechanical strength and dimensional accuracy.

The invention will now be described with reference to examples, however, the examples are illustrative only, and the invention is not limited thereto.

It is known that the plasticity of clay-water mixture is determined by hydrogen bonding formed through interaction of the surface of clay particles and water therearound, namely adhering strength and amount of the water bonded to the surface (binding water) of clay particles, and it is generally accepted that what is called a characteristic value is useful as a measure of plasticity of a plastic composition.

The characteristic value, CV, is defined by:

$$CV = \frac{W_{40} - W_{100}}{W_{RT} - W_{100}} \times 100(\%)$$

wherein $W_{40}$ and $W_{100}$ are weights at drying temperatures of 40° C. and 100° C., respectively, of clay-water mixture which has plastic deformation ratios $H_0/H$ of 3.3 determined by Pfefferkorn method, and $W_{RT}$ is weight of the clay-water mixture at room temperatures (Y. Shibazaki, Clay Science, Vol. 24, No, 2, pp. 47–55 (1984)).

In the following examples, CV's of plastic compositions of inorganic powders were determined by a simplified method of the above. A predetermined amount $W_{RT}$ of a plastic composition was dried at 40° C. over three to four days, and then the plastic composition was heated at 100° C. for one day or more until a constant weight $W_{100}$ was reached. Then CV was calculated as follows:

$$CV = \frac{W_{40} - W_{100}}{W_{RT} - W_{100}} \times 100(\%)$$

EXAMPLE 1

A polysaccharide shown in Table 1 was added to 50 g of high purity alumina powder (purity of 99.99%, BET specific surface area of 14 m²/g, average particle size of 0.22 microns), and fully admixed together. Then 20 g of distilled water was added to the mixture and kneaded to a uniform aqueous mixture. The mixture was sealed in a synthetic resin envelope and placed in a thermostat at 40° C. for one day. Thereafter, the envelope was taken out of the thermostat, and the mixture was kneaded in the sealed envelope, and then aged for one day, to provide a plastic composition. The CV of the plastic composition is shown in Table 1.

For comparison, polyethylene glycol was added to the same alumina powder as above in place of polysaccharides, and a plastic composition was prepared in the same manner as above. Further plastic compositions were prepared using the same alumina as above and Iga-Kibushi clay, respectively, without the assistance of polysaccharides. The CV of these plastic compositions are also shown in Table 1.

TABLE 1

|  | Polysaccharides (W/W %) | CV (%) |
| --- | --- | --- |
| Examples | Pectic acid (5.0) | 1.84 |
|  | Chondroitin sulfate (5.0) | 2.20 |
|  | Gellan gum (4.0) | 1.10 |
|  | Curdlan (5.0) | 2.23 |
| Comparative | Polyethyle glycol* (5.0) | 0.51 |
|  | (Alumina only) | 0.49 |
|  | (Iga-Kibushi clay only) | 2.56 |

Notes *Average molecular weight of 600.

EXAMPLE 2

Readily sinterable, low soda content alumina AES-11 (purity of 99.5%, BET specific surface area of 6–7 m²/g, average particle size of 0.4–0.5 microns, Sumitomo Kagaku Kogyo K.K., Japan) was used, and otherwise in the same manner as in Example 1, plastic compositions of the alumina were prepared. For comparison, a plastic matter was prepared without the aid of polysaccharides. The CV of these plastic compositions are shown in Table 2.

TABLE 2

|  | Polysaccharides (W/W %) | CV (%) |
| --- | --- | --- |
| Examples | chitosan (5.0) | 1.24 |
|  | Konjak mannan (5.0) | 0.91 |
|  | Xylan (5.0) | 1.06 |
|  | Locust bean gum (5.0) | 0.63 |
|  | Guar (5.0) | 0.65 |
|  | Dextran (5.0) | 1.24 |
|  | Pullulan (5.0) | 1.17 |
|  | Curdlan (5.0) | 1.78 |
| Comparative | (Alumina only) | 0.33 |

EXAMPLE 3

A polysaccharide shown in Table 3 was added to 50 g of partially stabilized zirconia (94.6% of zirconia and 4.7% of yttrium oxide, BET specific surface area of 7.5 m²/g, average particle size of 0.55 microns), fully mixed, and the mixture was formed into a plastic composition in the same manner as in Example 1. The CV of the plastic compositions thus obtained are shown in Table 3 together with that of a plastic composition of the partially stabilized zirconia prepared without the aid of polysaccharides.

TABLE 3

|  | Polysaccharides (W/W %) | CV (%) |
| --- | --- | --- |
| Examples | Curdlan (5.0) | 2.11 |
|  | Pectic acid (5.0) | 2.02 |
|  | Tragacanth gum (5.0) | 1.40 |
| Comparative | (Partially stabilized zirconia only) | 0.30 |

EXAMPLE 4

A polysaccharide shown in Table 4 was added to 50 g of New Zealand kaolin, fully mixed, and the mixture was formed into a plastic composition in the same manner as in Example 1. The CV of the plastic compositions thus obtained are shown in Table 4 together with that of a plastic composition of New Zealand kaolin prepared without the aid of polysaccharies. The New Zealand kaolin itself has a slight plasticity as is seen, however, the mixture thereof with a polysaccharide was found to show a larger plasticity.

TABLE 4

|  | Polysaccharides (W/W %) | CV (%) |
|---|---|---|
| Examples | Chondroitin sulfate (5.0) | 1.90 |
|  | Pectic acid (5.0) | 2.10 |
|  | Curdlan (5.0) | 2.25 |
| Comparative | (New Zealand kaolin only) | 0.80 |

As will be apparent, aqueous plastic compositions composed of inorganic powders and small amounts of polysaccharides have high plasticity in accordance with the invention.

EXAMPLE 5

Curdlan, pullulan or a mixture thereof were added to inorganic powders shown in Table 5 together with molding aids, and the mixture was fully admixed, and then kneaded with water for 30 minutes by means of a 500 ml capacity twin screw kneader, to provide plastic compositions. Methyl cellulose used is such that a 2% by weight aqueous solution thereof has a viscosity of 400 centipoises at 20° C. and polyethylene glycol used was of average molecular weight of about 6000.

The thus obtained plastic compositions were charged in a flow tester (Model CFT-500, K. K. Shimadzu Seisakusho, Japan), and extruded with a pressure of 10–300 kgf into cords of 1 mm in diameter to evaluate extrusion moldability of the plastic compositions; excellent when a cord of more than one m in length was obtained continuously; good when a cord of about one m in length was obtained; no good when a cord snapped while short.

The results are shown in Table 5.

TABLE 5

|  | Polysaccharides and AIDS | | | |  |
|---|---|---|---|---|---|
|  | Mixture Ratio[1] | Amounts Used[2] (parts by weight) | Water[2] (parts by weight) | Extrusion Pressures (kgf) | Plasticity |
| New Zealand kaolin | CUD 1 MC 0.5 PEG 0.5 | 1.0 | 42.5 | 200 | Good |
| New Zealand kaolin | CUD 1 MC 0.5 PEG 0.5 | 2.0 | 42.5 | 200 | Excellent |
| New Zealand kaolin | CUD 1 PEG 0.25 | 2.0 | 45.0 | 200 | Excellent |
| New Zealand kaolin | CUD 1 PULL 0.5 PEG 0.25 | 2.0 | 45.0 | 200 | Excellent |
| New Zealand kaolin | CUD 1 PULL 1 PEG 0.5 | 1.25 | 42.0 | 200 | Good |
| New Zealand kaolin | CUD 1 PULL 3 PEG 1 | 1.25 | 42.0 | 200 | Good |
| Talc | CUD 1 MC 0.5 PEG 0.25 | 4.0 | 48.0 | 200 | Good |
| Talc | CUD 1 MC 0.5 PEG 0.25 | 7.0 | 70.0 | 50 | Excellent |
| Cordierite | CUD 1 MC 0.5 PEG 0.25 | 2.0 | 42.5 | 200 | Good |
| Cordierite | CUD 1 MC 0.5 PEG 0.25 | 4.0 | 45.0 | 200 | Excellent |
| Alumiana AES-11 | CUD 1 MUC 0.5 PEG 0.25 | 1.75 | 22.0 | 300 | Excellent |
| Alumiana AES-11 | CUD 1 MC 0.5 PEG 0.25 | 1.75 | 23.5 | 300 | Excellent |
| Alumiana AES-11 | CUD 1 MC 0.5 PEG 0.25 | 1.75 | 25.0 | 300 | Good |
| Alumiana AES-11 | PULL | 2.0 | 22.0 | 300 | Excellent |
| High silica content zeolite | CUD 1 MC 1 PEG 1 | 5.0 | 80.0 | 20 | Good |
| Mizucalife[3] P-12 (MgO—Al$_2$O$_3$—SiO$_2$) | CUD 1 MC 1 PEG 1 | 10.0 | 17.0 | 20 | Good |
| Cepiolite | CUD 1 MC 1 PEG 0.25 | 9.0 | 90.0 | 20 | Good |
| Zirconia | CUD 1 MC 0.5 | 2.0 | 37.0 | 200 | Excellent |

TABLE 5-continued

|  | Polysaccharides and AIDS | | Water[2] (parts by weight) | Extrusion Pressures (kgf) | Plasticity |
|---|---|---|---|---|---|
|  | Mixture Ratio[1] | Amounts Used[2] (parts by weight) | | | |
| Hydroxyapatite | PEG 0.25<br>CUD 1<br>MC 1 | 10 | 100 | 50 | Good |
| Mixture of zirconia and hydroxyapatite | PEG 0.25<br>CUD 1<br>MC 1<br>PEG 0.25 | 8.0 | 60 | 50 | Excellent |

Notes:
[1] In weight. CUD, curdlan; MC, methyl cellulose; PEG, polyethylene glycol, PULL, pullulan.
[2] Parts by weight in relation to 100 parts by weight of inorganic powder.
[3] Tradename

EXAMPLE 6

The plastic compositions shown below were prepared, molded into teacup forms or the like with a potter's wheel, dried and baked in conventional manners to evaluate moldability of the plastic compositions. Methyl cellulose and polyethylene glycol used were the same as beforementioned. Parts are by weight.

| Plastic composition of alumina | |
|---|---|
| Alumina AES-11 | 100 parts |
| Curdlan | 1.14 |
| Methyl cellulose | 0.57 |
| Polyethylene glycol | 0.29 |
| Water | 30 |
| Plastic composition of cordierite | |
| Cordierite | 100 parts |
| Curdlan | 2.29 |
| Methyl cellulose | 1.14 |
| Polyethylene glycol | 0.57 |
| Water | 47.5 |
| Plastic composition of New Zealand caolin | |
| New Zealand caolin | 100 parts |
| Curdlan | 1.00 |
| Methyl cellulose | 0.50 |
| Polyethylene glycol | 0.25 |
| Water | 45 |
| Plastic composition of zirconia | |
| Zirconia | 100 parts |
| Curdlan | 2.00 |
| Methyl cellulose | 0.50 |
| Polyethylene glycol | 0.50 |
| Water | 36 |

The plastic composition of alumina was found excellent in moldability and was suitable to provide teacups as well as bottle-like containers such as sake bottles. The plastic composition of New Zealand kaolin was found more excellent in moldability, and was able to be molded with a potter's wheel in the same manner as in molding of Seto-Kibushi clay. Namely, the plastic composition of New Zealand kaolin was found comparable in moldability to natural high quality clay-water mixtures. Cordierite also provided a plastic composition similar to that of alumina in moldability. The plastic composition of zirconia was found least moldable among the above, however, it was suscessfully molded into teacups.

REFERENCE 1

Production and Purification of Curdlan (A)

In accordance with the method described in Japanese Patent Publication No. 48-32673, a culture broth was treated with an alkali, centrifuged, neutralized with an acid, to provide a solution of curdlan. The solution was desalted and concentrated to provide curdlan (A).

Production and Purification of Curdlan (B)

The above-mentioned solution of curdlan was desalted, concentrated, freeze-dried, and crushed with a fish mill, to provide curdlan (B).

Production and Purification of Curdlan (C)

The aforesaid culture broth was desalted and concentrated as it was, freeze-dried, and crushed with a mill, to provide curdlan (C).

EXAMPLE 7

A powder of alumina AES-11 was mixed with a polysaccharide and optionally a molding assistance, and then kneaded under reduced pressures with a twin screw extruder for 30 minutes, to provide a plastic composition of alumina.

The plastic composition was extruded with a pressure of 200 kgf with a flow tester into sticks of 3 mm and 5 mm in diameter, respectively, and of 50 mm in length. The sticks were dried at room temperatures for 24 hours, at 40° C. for 24 hours, and then at 115° C. for 24 hours.

The dried molds were then heated in an electric oven at a rate of 3° C./minute from room temperatures to 800° C., and at a rate of 2° C./minute from 800° C. to 1600° C., and thereafter maintained at 800° C. for three hours, followed by standing at room temperatures in the oven.

The three point bending strengths of the thus obtained sintered alumina bodies were measured by means of an autograph (Model AG-1000, K. K. Shimadzu Seisakusho, Japan) with a span of 20 mm and at a cross head speed of 0.5 mm/minute. The results are shown in Table 6. The three point bending strength is given by the following equation:

$$\sigma = 8PL/\pi d^3$$

wherein P is a maximum breaking strength (kgf), L is a distance between a couple of supports, and d is a diameter (mm) of a test specimen.

For comparison, an amount of 4 g of a commercially available binder was added to 400 g of alumina AES-11 powder, and a plastic composition was prepared and sintered in the same manner as above, to provide a sintered body which was found to have a bending strength shown in Table 6.

TABLE 6

| | Runs | Polysaccharides and AIDS Mixture Ratio[1] | | Amounts Used[2] (parts by weight) | Water[2] (parts by weight) | Stick Diameter (mm) | Bending Strength[3] (kgf/mm$^2$) |
|---|---|---|---|---|---|---|---|
| Example 7 | 1 | PA | | 2.0 | 23.0 | 5 | 37 |
| | 2 | CUD (A) | | 2.0 | 23.0 | 5 | 37 |
| | 3 | CUD (B) | | 2.0 | 22.0 | 5 | 40 |
| | 4 | CUD | 1.14 | 2.0 | 22.0 | 5 | 42 |
| | | MC | 0.57 | | | | |
| | | PEG | 0.29 | | | | |
| | 5 | CUD (B) | 1.75 | 2.0 | 22.0 | 3 | 48 |
| | | PEG | 0.25 | | | | |
| | 6 | CUD (B) | 1.50 | 2.0 | 22.0 | 3 | 52 |
| | | PULL | 0.25 | | | | |
| | | PEG | 0.25 | | | | |
| | 7 | CUD (B) | 1.0 | 2.0 | 22.0 | 3 | 42 |
| | | PULL | 0.75 | | | | |
| | | PEG | 0.25 | | | | |
| Comparative Example[4] | | | | 4.0 | 20.0 | 5 | 37 |

Notes:
[1] In weight. PA, pectic acid; CUD, curdlan; MC, methyl cellulose; PEG, polyethylene glycol, PULL, pullulan.
[2] Parts by weight in relation to 100 parts by weight of inorganic powder.
[3] Three point bending strength
[4] Commercially available binder for extrusion molding was used. Cerander YB81 by Yuken Kogyo K. K. (Japan)

EXAMPLE 8

An amount of 0.1 kg of curdlan (A) was added to 5 kg of alumina AES-11 (2 parts by weight of curdlan (A) in relation to 100 parts by weight of alumina), and fully dry-mixed, and then 1.25 kg of pure water (25 parts by weight in relation to 100 parts by weight of alumina) were added to the mixture, and kneaded with a twin screw extruder for 15 minutes, to provide a plastic composition of the alumina.

The plastic composition was extruded continuously with a screw extruder into sticks of 8 mm in diameter and 60 mm in length. The sticks were dried at room temperatures for 24 hours, and then at 115° C. for 24 hours.

The dried sticks were then heated in an electric oven at a rate of 3° C./minute from room temperatures to 800° C., kept at the temperature for three hours, heated to 1550° C. at a rate of 2° C./minute, and kept at the temperature for three hours, followed by standing in the oven for nine hours at room temperatures.

The three point bending strengths of the thus obtained sintered alumina body were measured in the same manner as in Example 7. The results are shown in Table 7.

In the same manner as above, either curdlan (A), (B) or (C), and water, optionally together with a molding aid were added to a powder of alumina AES-11, in amounts as shown in Table 7, and plastic compositions were prepared, and sintered. The three point bending strengths of the thus obtained sintered alumina body were shown in Table 7.

COMPARATIVE EXAMPLE 1

An amount of 0.25 kg of a commercially available binder (A) was added to 5 kg of alumina AES-11 powder (5 parts by weight of binder in relation to 100 parts by weight of alumina), and a plastic composition was prepared and sintered in the same manner as in Example 8. The three point bending strength of the sintered body is shown in Table 7.

COMPARATIVE EXAMPLE 2

To an amount of 5 kg of alumina AES-11 powder were added 0.25 kg of a commercially available binder (B) (5 parts by weight in relation to 100 parts by weight of alumina) and 1.0 kg of pure water (20 parts by weight in relation to 100 parts by weight of alumina), and a plastic composition was prepared and sintered in the same manner as in Example 8. The three point bending strength of the sintered body is shown in Table 7.

TABLE 7

| | Runs | Polysaccharides and AIDS Mixture Ratio[1] | | Amounts Used[2] (parts by weight) | Water[2] (parts by weight) | Bending Strength[3] (kgf/mm$^2$) |
|---|---|---|---|---|---|---|
| Example 8 | 1 | CUD (A) | | 2.0 | 25.0 | 39 |
| | 2 | CUD (A) | 1.14 | 2.0 | 25.0 | 42 |
| | | MC | 0.57 | | | |
| | | PEG | 0.29 | | | |
| | 3 | CUD (B) | | 2.0 | 25.0 | 40 |
| | 4 | CUD (C) | | 2.0 | 25.0 | 39 |
| | 5 | CUD (A) | 1.0 | 2.0 | 25.0 | 36 |
| | | PVA | 1.0 | | | |
| | 6 | CUD (B) | 1.14 | 2.0 | 25.0 | 40 |
| | | MC | 0.57 | | | |
| | | PEG | 0.29 | | | |
| Comparative Example 1[4] | | | | 5.0 | 20.0 | 35 |

TABLE 7-continued

| | | Polysaccharides and AIDS | | |
|---|---|---|---|---|
| Runs | Mixture Ratio[1] | Amounts Used[2] (parts by weight) | Water[2] (parts by weight) | Bending Strength[3] (kgf/mm²) |
| 2[5] | | 10 | 15.0 | 24 |

Notes:
[1] In weight. CUD, curdlan; MC, methyl cellulose; PEG, polyethylene glycol; ALA, ammonium alginate; PVA, polyvinyl alcohol (average polymerization degree of 500).
[2] Parts by weight in relation to 100 parts by weight of inorganic powder.
[3] Three point bending strength
[4] Commercially available binder for extrusion molding was used. Cerander YB80W by Yuken Kogyo K. K. (Japan)
[5] Commercially available binder for extrusion molding was used. Cerander YB81 by Yuken Kogyo K. K. (Japan)

What is claimed is:

1. An aqueous plastic composition of a technical ceramic powder which per se has substantially no plasticity which comprises: a technical ceramic powder selected from the group consisting of oxides, carbides, nitrides, borides, kaolinite, natural kaolin, talc, sepiolite, synthesized clay, hydroxyapatite, and mixtures thereof and curdlan in an amount of about 0.1–10% by weight based on the technical ceramic powder.

2. The plastic composition of claim 1 wherein the composition contains a molding assistance compound selected from the group consisting of a cellulosic compound, a polyhydric compound, a polyvinyl compound and a mixture thereof.

3. The composition of claim 1, wherein the powder has a particle size of not more than 1 micron.

4. A method of producing a sintered body of a technical ceramic powder which per se has substantially no plasticity which comprises: admixing and kneading a technical ceramic powder selected from the group consisting of oxides, carbides, nitrides, borides, kaolinite, natural kaolin, talc, sepiolite, synthesized clay, hydroxyapatite, and mixtures thereof with curdlan in an amount of about 0.1–10% by weight based on the technical ceramic powder in the presence of water in amounts sufficient to provide a plastic composition, molding the plastic composition, drying the plastic composition, and sintering the plastic composition at a temperature of not less than about 800° C.

5. The method of claim 4 wherein the plastic composition contains a molding assistance compound selected from the group consisting of a cellulosic compound, a polyhydric compound, a polyvinyl compound and a mixture thereof.

6. The method of claim 4, wherein the powder has a particle size of not more than 1 micron.

7. The method of claim 4 wherein the technical ceramic powder is a member selected from the group consisting of alumina, titania, synthesized cordierite, silicon carbide, boron carbide, tungsten carbide, silicon nitride, aluminum nitride, boron nitride, zirconium boride, titanium boride, kaolinite, natural kaolin, talc, sepiolite, synthesized clay, hydroxyapatite and mixtures thereof.

8. The method of claim 4 wherein the technical ceramic powder is a member selected from the group consisting of alumina, titania and synthesized cordierite.

9. The method of claim 4 wherein the technical ceramic powder is a member selected from the group consisting of silicon carbide, boron carbide and tungsten carbide.

10. The method of claim 4 wherein the technical ceramic powder is a member selected from the group consisting of silicon nitride, aluminum nitride and boron nitride.

11. the method of claim 4 wherein the technical ceramic powder is a member selected from the group consisting of zirconium boride, and titanium boride.

12. The method of claim 4 wherein the technical ceramic powder is a member selected from the group consisting of kaolinite, natural kaolin, talc, sepiolite, synthesized clay and hydroxyapatite.

13. The method of claim 4 wherein the technical ceramic powder is alumina.

* * * * *